July 2, 1929.  J. S. McWHIRTER  1,719,436
SECURING DEVICE FOR AXLE BEARINGS
Filed July 29, 1924
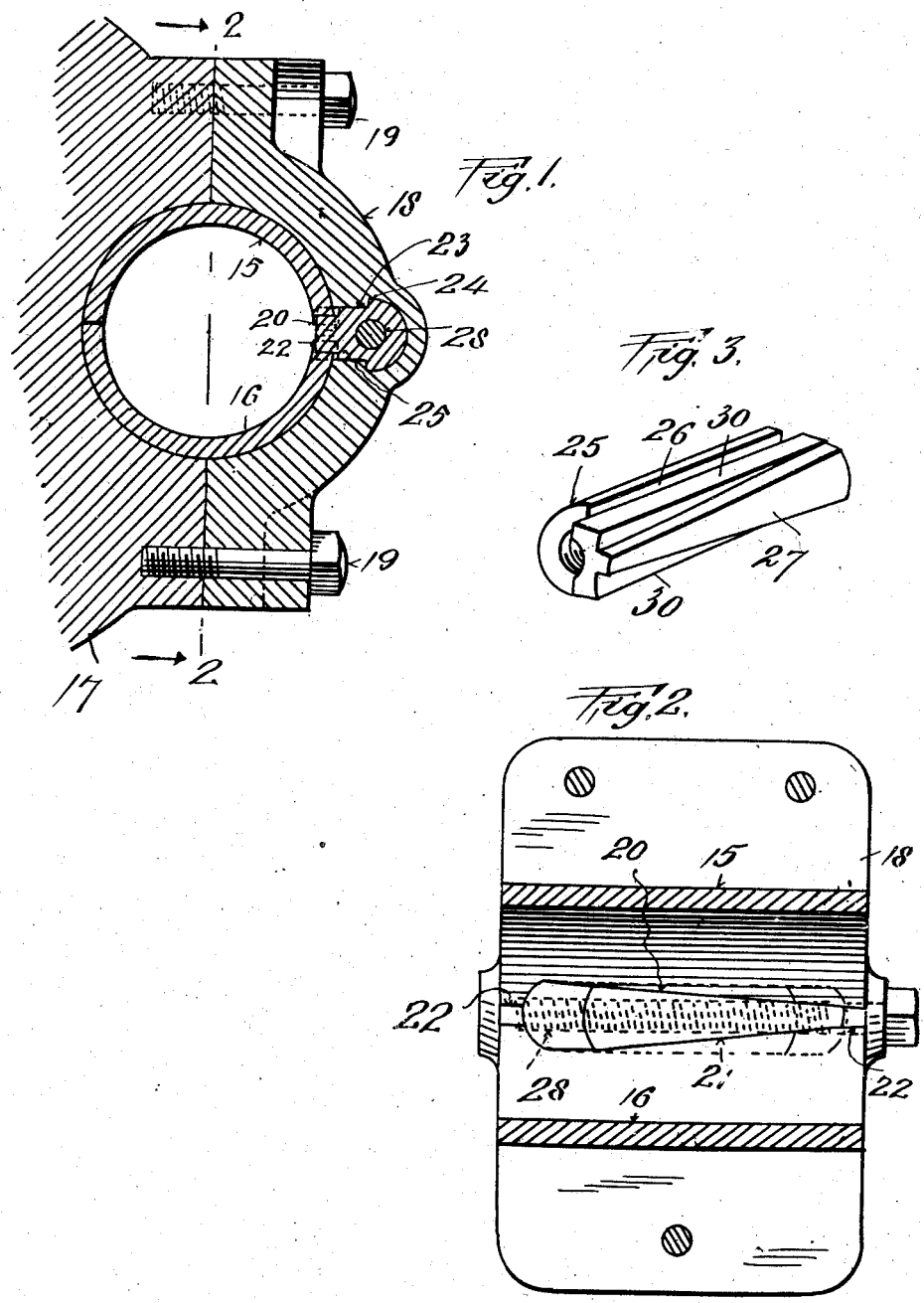
INVENTOR
John S. McWhirter
BY
Darby & Darby
ATTORNEYS Patented July 2, 1929.

1,719,436

UNITED STATES PATENT OFFICE.

JOHN S. McWHIRTER, OF WESTPORT, CONNECTICUT.

SECURING DEVICE FOR AXLE BEARINGS.

Application filed July 29, 1924. Serial No. 728,825.

This invention relates to devices for securing bearing sleeves in journal boxes for axles, shafts, or the like.

The object of the invention is to provide means which are simple and efficient for securing bearing sleeves in journal boxes.

A further object of the invention is to provide means to expand or tighten the lining or bearing sleeves of journal bearings and, at the same time, hold the same efficiently against rotative displacement within the journal box.

Other objects of the invention will appear more fully hereinafter.

The invention consists substantially in the construction, combination, location and relative arrangement of parts, all as will be more fully hereinafter set forth, as illustrated in the accompanying drawings, and finally pointed out in the appended claims.

In the accompanying drawings,

Fig. 1 is a view in vertical transverse section through a journal box and its lining sleeve showing a form of expanding and securing device for the sleeve, embodying the principles of my invention wherein a screw actuated wedge block is employed to tighten or expand and to lock the sleeve.

Fig. 2 is a view in section on the line 2, 2, Fig. 1, looking in the direction of the arrows.

Fig. 3 is a detached detail view of the wedge member employed in the structure shown in Figs. 1 and 2.

The same part is designated by the same reference numeral wherever it occurs throughout the several views.

It is a common practice to employ brasses, linings or sleeves for journal boxes or bearings of axles, shafts or the like, the lining or sleeve forming the surface or bearing contact of the axle or shaft within the journal box or housing. It is also a common practice, particularly in the case of motors employed to drive street and other railway cars, to form one part of the bore in which the lining or sleeve is received, in the motor frame and the other part of such bore in a cap which is bolted to the motor frame, and to mount in said bore the lining or bearing sleeve, or the sections composing the same, if of the split type or the sectional type. In assembling the lining or sleeve, whether of the split, sectional, or other type, in its seat, or in the bore above referred to, and in order to facilitate such assembly, it is sometimes the practice to employ a lining or sleeve having a slightly less exterior diameter than the interior diameter of the bore in which the lining or sleeve is to be received. It is very important and desirable that the bearing sleeve or lining be held rigidly against axial rotative displacement or movement within its seat in the housing bore, and this is particularly necessary where the lining is made to fit loosely in the bore to facilitate slipping it into place. Any looseness of the bearing sleeve within its seating bore causes rapid wear on the outer surface of the sleeve as well as the surface of the bore within which the sleeve is seated. This latter trouble is particularly objectionable for the reason that any enlargement of the sleeve seating bore makes it difficult, if not impossible, for a new sleeve, when substituted therein for replacement of a worn sleeve, to sufficiently compensate for the increased size and irregularity of the bore when the latter also becomes worn, and hence a new sleeve or lining is excessively loose initially. Moreover, looseness of the bearing sleeve or lining, by reason of the resulting increased vibration to which, in use, it is subjected, frequently causes breakage of the sleeve, and increased strains on the axle or shaft journaled therein and on the bolts or screws which hold the cap onto the frame or housing. Again, in some instances, particularly in the case of railway motor mountings where the axle is journaled in the bearing sleeve, such axle is geared through intermeshing pinions to the motor shaft. In order to enable this gearing to operate at maximum efficiency of power transmission, and with minimum wear on the teeth of the transmission gearing, it is necessary to maintain a fixed relation between the axle and motor shaft axes. Any looseness of the axle bearing sleeve in its journal seat tends to destroy this relation of the axle and motor shaft axes, and hence to reduce the efficiency of power transmission and to increase the rate of wear on the gear teeth, and to cause objectionable noise and chatter during the operation of the motor.

It has been proposed heretofore to lock the axle bearing sleeve within its seating bore in the motor frame and axle cap by means of dowel pins, or by key and feather connections between the sleeve and its seating surface within the bore into which it is fitted. Such expedients, however, have not proven satisfactory. Under the torsional strains imposed upon such sleeves through friction between the contacting surfaces of the axle or shaft and the sleeve or lining within which it rotates, and particularly where the lubrication of such contacting surfaces is inadequate, or fails through neglect or otherwise, the dowel pin or key devices are subjected to tremendous strains and wear, and within a comparatively short time, or mileage distance of operation, the dowel pins or keys wear loose and sometimes shear off, and the dowel holes or key seats similarly become worn or elongated, thereby producing looseness with all the attendant objections above noted, as well as others.

It is among the special purposes of my present invention to provide means which are exceedingly simple and effective, for rigidly securing the bearing sleeve or lining within its bore in a journal bearing, and in accomplishing this purpose I propose to adjustably expand the sleeve, or the sections thereof, in the case of a split or sectional sleeve, within its bore, thereby not only causing it to hug tightly against the inner surface of its seating bore but to be rigidly held against any possibility of axial movement. I also propose to provide means for this purpose which can be readily and easily applied and adjusted, and which permits the ready and easy assembly of the bearing sleeve in place or its removal when desired, thereby enabling the axle or shaft and motor shaft axes to be maintained in their correct relation to secure the maximum of efficiency in the transmission of power, and the minimum of wear on the gear teeth, and to also secure less noise and chatter in the operation of the motor.

In order to relieve the shearing strain on the bolts which hold the cap on the bearing block it has been the usual practice to insert several dowel pins between the block and cap. It has been found, however, that my invention eliminates the necessity for these dowels, thus simplifying the construction and manufacture of bearings and thereby reducing the cost of production.

Referring to the drawing, I have shown therein an embodiment wherein I employ a bearing sleeve or lining, shown in this instance as of the split type, and composed of the sections 15, 16, which are assembled within a bore or seating formed partially in the housing or frame 17 and the cap 18, the latter being secured to the housing or frame in any desired manner, as, for example, by means of bolts 19, in the usual way. In this case I slit the sleeve and cut or form the opposed edges of the slit, or the opposed edges of two adjacent sections, in case of a sleeve of the split type, along lines which are inclined to each other, from a point near the other end, thereby forming a tapered opening between such edges, the line of taper thereof being indicated at 20, 21. This slot does not extend all the way the whole length of the sleeve. Instead there are left short lengths or portions of the edge surfaces of the sleeve at each end of the tapered slot, as indicated at 22, which normally bear against each other, and which in their square faces bearing against each other at the opposite ends of the sleeve, serve to maintain the proper normal contour and dimensions of the sleeve. The cap 18 is formed on its inner surface with a slot or recess 23, which is provided with an off-set 24. This slot or recess extends only part way the length or width of the cap and mounted to slide therein is a slide member 25 having a shoulder 26 which is received and works in the off-set 24 of said slot or recess. The slide member 25 is provided on its inner edge with a wedge faced extension 27, the wedge faces of which are received between the tapered edges 20, 21, of the sleeve. An adjusting screw 28 is threaded through the member 25, so that by turning said screw the member 25 is caused to travel in one direction or the other, according to the direction in which the screw is turned, thereby causing the wedge faced portion 27 thereof to force the tapered edges 20, 21, of the sleeve apart or away from each other and hence expanding the sleeve circumferentially and causing it to fit tightly against its bearing surface within the bore in the housing and cap in which it is seated and securely locking said sleeve against looseness and against axial displacement. The slide member 25 is shown as having the straight side wall surfaces 30, which fit and slide against the side walls of the channel 23, while the shoulders 26 of the member 25, engage and slide in the off-set 24 of the channel 23. This affords a most efficient channel seat for the wedge key member 25, within the channel in the bearing cap 18, while permitting the wedge portion of the key to project beyond the inner surface of the cap 18, and into the space between the meeting edges of the sleeve sections 15, 16.

The sleeve 15—16 when expanded tightly into the half seats in 17 and 18 forms in effect an interlocking engagement of extended length between 17 and 18 and thereby secures a dowel pin engaging effect which is far more effective than the dowel pins sometimes used in structures of this nature, and this also enables the old time dowel pin arrangement to be dispensed with. Practise has demonstrated the value of this added function.

From the foregoing description it will be seen that I provide an exceedingly simple arrangement for taking up any looseness of the shaft or axle bearing sleeve within its seating in a journal box, and maintaining the same fitted tightly against its seating surface in said journal box, and holding it against rotative movement in its seat, while at the same time permitting the bearing sleeve to be easily and quickly inserted in place or removed. It will also be seen that the tightening of the bearing sleeve in its seating is accomplished by pressure applied thereto in the direction of its circumferential surface thereby expanding such sleeve circumferentially within its seating, and by means applied to or between the opposed edges of a slit therein, or between the opposed proximate edges of adjacent sections of the sleeve, the pressure means being retained in its engagement with said edges and forming additional means to prevent rotative movement of the sleeve.

While I have shown my invention as applied to a conventional structure of journal box in which the box is composed of a frame or housing member 17 and a cap 18 applied thereto, the meeting faces of which lie in a vertical plane, it is to be understood that I am not to be limited or restricted in this respect, as my invention is equally well adapted for use in other forms, arrangements, structures and types of journal boxes. And while I have described my invention as applied to railway motors and their mountings, it is to be understood that I am not to be limited or restricted in this respect, as my invention is well adapted for use in connection with journal boxes and bearings employed in other machines and apparatus.

Having now set forth the objects and nature of my invention, and various forms of practical embodiments thereof, what I claim as new and useful, and of my own invention, and desire to secure by Letters Patent is:

1. The combination with a journal box and a bearing sleeve therein having a slot with longitudinally tapered edges converging toward one end of said sleeve of a two part member, one of said parts having a wedge portion disposed in said slot and its other part being secured in said journal box and means for moving one part of said member with respect to the other to move said wedge portion in said slot to expand said sleeve in said box.

2. The combination with a journal box and a bearing sleeve therein having a slot with longitudinally tapered edges converging toward one end of said sleeve of a two part member one of said parts being adapted to expand said sleeve when moved longitudinally thereof, and means for moving said movable part the other part of said member cooperating with the movable part and said means for varying it to cause the wedge portion of the member to move in said slot.

3. The combination with a journal box having a keyway extending parallel to the axis of the bore thereof, and a bearing sleeve seated in said bore, said sleeve being split in the direction of its length, of a longitudinally adjustable wedge key mounted in said keyway and having a wedge portion interposed between the opposed edges of the split to separate said edges apart from each other, said key also serving to lock the sleeve against rotative movement within its seating.

4. The combination with a journal box, and a split bearing sleeve seated therein, the opposed edges of adjacent sleeve sections being relatively inclined, of a slide member mounted in the journal box for longitudinal adjustment in a line parallel with the axis of said sleeve and having a wedge portion engaging between said inclined edges, and means to longitudinally adjust said slide member.

5. The combination with a frame portion and a cap, said frame and cap cooperating to form a journal bearing, and a longitudinally split sleeve adapted to be received within said bearing, of means carried by the cap and adjustable in the direction of the length and parallel to the axis of the sleeve and having a wedge portion arranged to engage between opposed edges of adjacent sections of the split ring to impart radial expansion to the said sleeve.

6. The combination with a frame portion and a cap, said frame and cap cooperating to form a journal bearing, and a longitudinally split sleeve adapted to be received within said bearing, the opposed edges of adjacent sections of said sleeve normally abutting against each other at their ends but separated apart intermediate their ends on longitudinally extending lines inclined to each other, of means engaging between said inclined edges to spread the same apart by moving longitudinally of the bearing between said inclined edges.

7. The combination with a frame portion and a cap, said frame and cap cooperating to form a journal bearing, and a longitudinally split sleeve adapted to be received within said bearing, the opposed edges of adjacent sections of said sleeve being inclined relatively to each other, of a member mounted in said cap for adjustment in the direction of the length of said sleeve and having a wedge shaped portion to extend between said inclined edges, and a screw engaging said member to adjust the same in the direction of the length of said sleeve.

In testimony whereof I have hereunto set my hand on this 22nd day of July A. D., 1924.

JOHN S. McWHIRTER.